(12) United States Patent
Olmstead et al.

(10) Patent No.: US 7,224,540 B2
(45) Date of Patent: May 29, 2007

(54) EXTENDED DEPTH OF FIELD IMAGING SYSTEM USING CHROMATIC ABERRATION

(75) Inventors: Bryan L. Olmstead, Eugene, OR (US); Alan Shearin, Eugene, OR (US)

(73) Assignee: Datalogic Scanning, Inc., Eugene, OR (US)

( * ) Notice: Subject to any disclaimer, the term of this patent is extended or adjusted under 35 U.S.C. 154(b) by 0 days.

(21) Appl. No.: 11/048,624

(22) Filed: Jan. 31, 2005

(65) Prior Publication Data

US 2006/0171041 A1    Aug. 3, 2006

(51) Int. Cl.
*G02B 9/00* (2006.01)
*G02B 13/14* (2006.01)

(52) U.S. Cl. .............. 359/754; 359/355; 235/462.41; 250/339.05

(58) Field of Classification Search ........ 359/739–741; 250/339.01, 339.05
See application file for complete search history.

(56) References Cited

U.S. PATENT DOCUMENTS

| | | | | |
|---|---|---|---|---|
| 5,359,185 | A | 10/1994 | Hanson | 235/472 |
| 5,386,105 | A | 1/1995 | Quinn et al. | 235/462 |
| 5,418,356 | A | 5/1995 | Takano | 235/472 |
| 5,438,187 | A | 8/1995 | Reddersen et al. | 235/462 |
| 5,468,950 | A | 11/1995 | Hanson | 235/472 |
| 5,623,137 | A * | 4/1997 | Powers et al. | 235/462.23 |
| 5,625,495 | A | 4/1997 | Moskovich | 359/663 |
| 5,635,699 | A | 6/1997 | Cherry et al. | 235/462 |
| 5,745,176 | A | 4/1998 | Lebens | 348/370 |
| 5,748,371 | A | 5/1998 | Cathey | 359/558 |
| 5,825,044 | A | 10/1998 | Allen | 250/557 |
| 5,945,670 | A | 8/1999 | Rudeen | 250/235 |
| 6,056,198 | A | 5/2000 | Rudeen et al. | 235/462.24 |
| 6,073,851 | A | 6/2000 | Olmstead et al. | 235/462.45 |

(Continued)

FOREIGN PATENT DOCUMENTS

JP        56-50469      *  5/1981

(Continued)

OTHER PUBLICATIONS

Modulation Transfer Function (no date); downloaded from http://www.mellesgriot.com/glossarywordlist/glossarydetails.asp?wID=263, visited May 2005.

(Continued)

*Primary Examiner*—Jordan M. Schwartz
(74) *Attorney, Agent, or Firm*—Stoel Rives LLP

(57) ABSTRACT

An imaging system (FIG. 3) is disclosed that has a wavelength dependent focal shift caused by longitudinal chromatic aberration in a lens assembly (203) that provides extended depth of field imaging due to focal shift (213,214) and increased resolution due to reduced lens system magnification. In use, multiple wavelengths of quasi-monochromatic illumination, from different wavelength LEDs (206, 207) or the like, illuminate the target, either sequentially, or in parallel in conjunction with an imager (200) with wavelength selective (colored) filters. Images are captured with different wavelengths of illumination that have different focus positions (208,209), either sequentially or by processing the color planes of a color imager separately. Extended depth of field, plus high resolution are achieved. Additionally, information about the range to the target can be determined by analyzing the degree of focus of the various colored images.

25 Claims, 5 Drawing Sheets

U.S. PATENT DOCUMENTS

| | | | |
|---|---|---|---|
| 6,142,376 A | | 11/2000 | Cherry et al. ............ 235/462.14 |
| 6,147,816 A | * | 11/2000 | Ori .............................. 359/794 |
| 6,290,135 B1 | | 9/2001 | Acosta et al. ........... 235/472.01 |
| 6,347,742 B2 | | 2/2002 | Winarski ................ 235/462.35 |
| 6,493,061 B1 | * | 12/2002 | Arita et al. .................... 355/41 |
| 6,568,594 B1 | | 5/2003 | Hendriks .................... 235/454 |
| 6,689,998 B1 | | 2/2004 | Bremer ..................... 250/201.2 |
| 2006/0060653 A1 | * | 3/2006 | Wittenberg et al. ..... 235/462.01 |
| 2006/0164541 A1 | | 7/2006 | Olmstead |
| 2006/0164736 A1 | | 7/2006 | Olmstead |

FOREIGN PATENT DOCUMENTS

JP             56050469        5/1981

OTHER PUBLICATIONS

Introduction to CMOS Image Sensors (2004); downloaded from http://micro.magnet.fsu.edu/primer/digitalimaging/cmosimages-sensors.html, visited Nov. 2004.

Modulation Transfer Function (2003); downloaded from http://www.micro.magnet.fsu.edu/primer/anatomy/mtfhome.html, visited Nov. 2004.

Nikon Microcopy Modulation Transfer Function (no date), downloaded from http://www.microscopyu.com/articles/mtfintro.html, visited Nov. 2004.

The Lensmaker's Equation (no date), downloaded from http://physics.mtsu.edu/~phys2020/Lectures/L1-L5/L3/Lensmakers/lensmakers.html, visited Jan. 2005.

The Electromagnetic Spectrum (no date) downloaded from http://csep10.phys.utk.edu/astr162/lect/light/spectrum.html, visited Jan. 2005.

Micro® Imaging Technology (2004); downloaded from http://micron.com/products/imaging/technology/index.html, visited Jan. 2005.

Jaroszewicz et al., "Lens Axicons: Systems Composed of a Diverging Aberrated Lens and a Perfect Converging Lens," *J. Opt. Soc. Am*, vol. 15, No. 9, Sep. 1998, pp. 2383-2390.

Jaroszewicz et al., "Lens Axicons: Systems Composed of a Diverging Aberrated Lens and a Converging Aberrated Lens," *J. Opt. Soc. Am*, vol. 16, No. 1, Jan. 1999, pp. 191-197.

* cited by examiner

EXTENDED DEPTH OF FIELD IMAGING SYSTEM USING CHROMATIC ABERRATION

RELATED APPLICATION

This application is related to U.S. application Ser. No. 11/045,213, filed Jan. 27, 2005, entitled IMAGING SYSTEM WITH A LENS HAVING INCREASED LIGHT COLLECTION EFFICIENCY AND A DEBLURRING EQUALIZER, by inventors Bryan L. Olmstead and Alan Shearin, incorporated herein by this reference. This application is also related to U.S. application Ser. No. 11/045,817, filed Jan. 28, 2005, entitled ILLUMINATION PULSING METHOD FOR A DATA READER, by inventor Bryan L. Olmstead, incorporated herein by this reference.

COPYRIGHT NOTICE

© 2005 PSC INC. A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR § 1.71(d).

TECHNICAL FIELD

This application relates generally to optical systems and elements and more particularly to optical imaging systems, such as those useful for data reading and other image capture applications.

BACKGROUND OF THE INVENTION

In data reading devices, a return light signal from the object or symbol being read is focused onto a detector or detector array. In the example of a bar code scanner, reading the bars and spaces of a typical bar code, there needs to be sufficient difference in signal intensity between the signal corresponding to the light space and the signal corresponding to the dark bar in order for the processor to differentiate between them. In scanner applications there has been demand for increased depth of field, i.e., the range of distance over which the scanner can effectively scan.

U.S. Pat. No. 6,073,851 to Olmstead et al. discloses use of multi-focus optical systems to increase depth of field in optical reader systems. Depth of field is increased through careful design of multi-focal lenses, for example, symmetrical lenses having a series of concentric circular zones (as viewed along the optical axis), each zone providing a different focal length. See '851 patent FIGS. 21 and 22 and columns 21–22. Such lenses are difficult and expensive to manufacture, and interzonal interference must be controlled. That said, they can be used advantageously in some embodiments of the present as explained below. Multi-focus systems are also disclosed of the '851 patent that employ multiple lenses, or lens arrays, as shown for example in FIGS. 35–37.

U.S. Pat. No. 5,945,670 to Rudeen is directed to an optical system for data reading having a large depth of field. There, a variable aperture device is deployed downstream of a laser light source focusing lens to vary the focal distance of the laser beam. The modified laser beam provides an outgoing source of (scanning) illumination of an object or target. Preferred embodiments herein, however, pertain to capturing and processing an "inbound" or return light signal reflected/refracted from a target object. Moreover, preferred embodiments herein pertain to 2-D optical data imaging, as distinguished from scanning (laser beam) methods. Similarly, U.S. Pat. No. 5,386,105 to Quinn et al. describes diffractive laser beam shaping methods and apparatus, "to control laser beam propagation, working range and beam cross-section in a bar code scanner" (Abstract).

U.S. Pat. No. 6,056,198 to Rudeen et al. describes an optical scanning system including a collection system for range enhancement. In one embodiment, an optical element such as a diffusion element or aperture is placed between a collection lens and a detector such that the amount of collected light from a far field target reaching the detector is maximized and the amount of collected light from a near field target reaching the detector is selectively inhibited, rendering the total light intensity on the detector more uniform.

For machine vision applications, large depth of field, high resolution, and high speed operation are often important system requirements. Estimation of the range to the target is sometimes desired. To achieve high speed operation, a large aperture is needed, in order to reduce motion blur. Unfortunately, a large aperture reduces the depth of field of the system, so speed and depth of field are conflicting requirements to the optical designer. Imager resolution, typically set by the number and size of the pixels, sets a limit on the optical magnification of the system to achieve a desired system resolution. Higher resolution is possible when the optical magnification is low, while larger depth of field is possible when the optical magnification is high. Therefore, high resolution and large depth of field are conflicting requirements to the optical designer. Nevertheless, the need remains for improvements in imaging systems to provide high speed, high resolution images with extended depth of field.

SUMMARY OF THE INVENTION

Conventional imaging systems are typically intended for polychromatic (white light) illumination. As such, the lens systems are carefully designed to have very small levels of chromatic aberration. These lenses are termed color corrected. If a lens that was not color corrected was used in a white light illumination application, a very blurry image would result, as some colors of the illumination would provide in-focus images, while others would be out of focus, due to the chromatic aberration of the lens. Conventional imaging systems can estimate a range to the target by focusing the lens system to best focus and recording the lens position.

The present invention improves on the prior art by using chromatic aberration to an advantage in an imaging system. Where typical imaging systems try to reduce chromatic aberration to provide a better focused white light image, the present invention leverages chromatic aberration to provide a wavelength dependent focal shift, and in some embodiments uses quasi-monochromatic illumination. (Quasi-monochromatic illumination behaves much like ideal monochromatic radiation. Thus, the frequencies of quasi-monochromatic light are strongly peaked about a selected frequency.) For many imaging applications, color is not an important feature and illumination relatively irrespective of wavelength can provide the necessary information. This is a reasonable limitation, for example, in many machine vision applications that look at the reflectivity profile of objects, such as optical character recognition, barcode reading, and inspection tasks.

In accordance with one aspect of the invention, a lens is formed of a highly dispersive material, such that the focal length changes significantly as a function of wavelength of incident light. A shorter wavelength is used to create a near field focus that lowers the optical magnification of the system, allowing the imager's resolution to be sufficient to read high density barcodes. An infrared light source can be used in some embodiments to enable high intensity illumination without disturbing the user. A second, shorter wavelength, for example visible light, can be used for high density reading as well as reading data sources such as barcodes that have little infrared contrast. In another embodiment, a doublet lens is arranged to provide a significant shift in focus as a function of wavelength. The doublet has a concave lens of crown glass in front of a convex lens of flint glass. This achieves substantial chromatic aberration to shift the focal length with wavelength.

As noted, one feature of the present invention is directed to exploiting two or more different wavelengths of light in a single optical data reading system. In accordance with one aspect of the invention, a "wavelength-dependent aperture" is disposed between a collection lens and the object being read or "target". In one embodiment, the aperture includes a central zone filter arranged to block light having wavelengths below a predetermined cutoff wavelength, such as visible light. The longer wavelength, lower frequency passes through the entire aperture (such as near-infrared light). For example, in bar code data reading applications, larger (lower density) bar codes imaged using IR passing through the entire aperture. Higher density bar codes (e.g. 5 mil) can be imaged using visible light that passes only through a portion (the peripheral zone in one embodiment) of the aperture. A focal shift caused by either chromatic aberration or undercorrected spherical aberration causes the visible light to focus to near field, and provides sufficient modulation for reading the higher density images.

For many imaging applications, images are captured using an electronic imaging device, such as a CCD or CMOS imager, both commercially available. Suitable imagers are available, for example, from Micron Technology, Inc. of Boise, Id., USA. In one implementation of the present invention, an imager is selected which is sensitive to a broad range of wavelengths, from visible to near-IR. The pixels of the imager are covered by a set of wavelength sensitive filters that divide the pixels into subsets according to wavelength sensitivity. Such an imager is commonly called a color imager, and the filter is a mosaic of pixel sized filters of different color transmission, such as red, green, and blue. Other filter choices are possible, such as a combination of visible and infrared filters.

A lens assembly that has intentionally uncorrected chromatic aberration is used to image the target onto the imager. Light-emitting diodes (LEDs) of at least two different wavelengths simultaneously illuminate the target in quasi-monochromatic light. (Suitable LEDs are widely available.) Because of the lens's chromatic aberration, in-focus images on the imager will occur from targets at different distances. The data from the imager is processed as separate color sub-images, called color planes (such as red, green, blue, and near-IR). The depth of field of each color plane is distinct and typically overlapping. The resolution of the closest focusing color plane is increased with respect to the furthest focusing color plane due to the reduction in optical magnification. In this embodiment, a single image is gathered that encompasses a large depth of field. Range to the target can be ascertained by determining which color plane is in best focus. Near and far focus are achieved with no moving parts.

In an alternative embodiment, an image is captured using an electronic imaging device, such as a CCD or CMOS imager, which is sensitive to a broad range of wavelengths, from visible to near-IR. All pixels of the imager are sensitive to the same range of wavelengths. Such an imager is termed a black and white imager. A lens assembly that has intentionally uncorrected chromatic aberration again is used to image the target onto the imager. LEDs illuminate the target in quasi-monochromatic light. In this example, at least two different wavelengths of LEDs are used that are sequentially illuminated in different image frames. In other words, one frame of image data "receives" a first wavelength, while another frame receives a different wavelength. One wavelength of illumination causes the imaging system to focus toward far field, which has a longer depth of field. Another wavelength of illumination causes the imaging system to focus toward near field, which has a lower magnification, ergo enhanced resolution. The depths of field of the two illumination settings can be made to overlap, extending the depth of field further. Range to the target can be ascertained by determining which colored image was in best focus.

A chromatically aberrated lens assembly appropriate for the present invention can take many forms. A first illustrative lens design comprises a refractive lens system with undercorrected chromatic aberration. In other words, the lens system exhibits sufficient chromatic aberration to be useful in the manner described herein to extend depth of field in a data or image capture application. The materials used in making lenses in general have dispersion (the variation of index of refraction with wavelength), so chromatic aberration is always present. Techniques exist (such as multi element designs mixing flint and crown glass lenses) to enhance or reduce chromatic aberration. Diffractive lenses inherently have large chromatic aberration, and so are especially suitable for the present invention, though other materials can be used.

An alternative lens assembly employs a wavelength sensitive aperture whose wavelength sensitivity is a function of aperture radius. A lens system with variable focal length with respect to aperture radius is used with the wavelength sensitive aperture. A variable focal length lens, having a focal length that is a function of aperture radius, can be created using undercorrected spherical aberration, as further described in the application entitled, "Image reader using a lens having an extended depth of field and a deblurring equalizer", cited above, or as a lens with discrete radial focal zones, as described in the background. In that regard, U.S. Pat. No. 5,770,847 is hereby incorporated herein by reference.

As an example, the lens assembly may be designed to have two zones, each passing a different wavelength. If a target is illuminated at those two wavelengths, a double image is formed on the imager. In focus images from each wavelength will occur at different distances. Either a color imager or sequential quasi-monochromatic illumination can be used to distinguish the images as mentioned above and further described below.

Additional aspects and advantages will be apparent from the following detailed description of preferred embodiments, which proceeds with reference to the accompanying drawings.

DETAILED DESCRIPTION OF THE PREFERRED EMBODIMENTS

Figure 1:
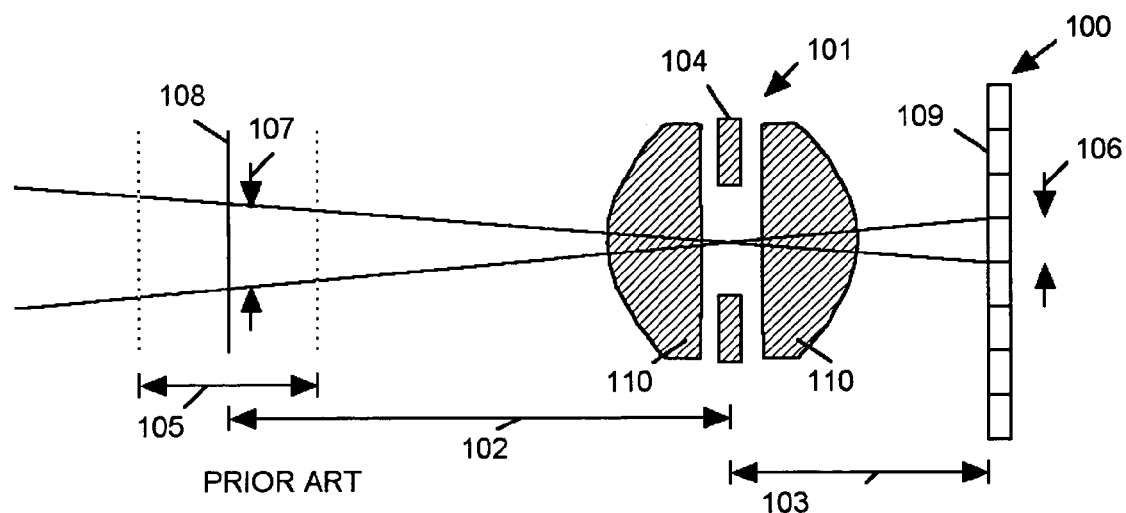
FIG. 1 illustrates certain limitations of prior art imaging systems.

Referring to FIG. 1, an imaging system typical of the prior art consists of an imager 100 composed of a plurality of pixels 109 and a lens assembly 101 composed of one or more lenses 110 and an aperture 104 spaced from the imager 100 by a distance 103. The lens assembly provides a focused image of a target 108 onto the imager 100 when the target 108 is at distance 102 from the aperture 104. The lens assembly 101 provides a sufficiently focused image of target 108 over a depth of field 105 determined by the size of the aperture 104. The pixel size 106 of pixels 109 of imager 100 provides a projected resolution 107 based on the optical magnification, which is defined as the ratio of object distance 102 to image distance 103. So the resolution of an imaging system is determined by the pixel size 106 and the optical magnification. The depth of field is determined by the aperture size 104.

Figure 2:
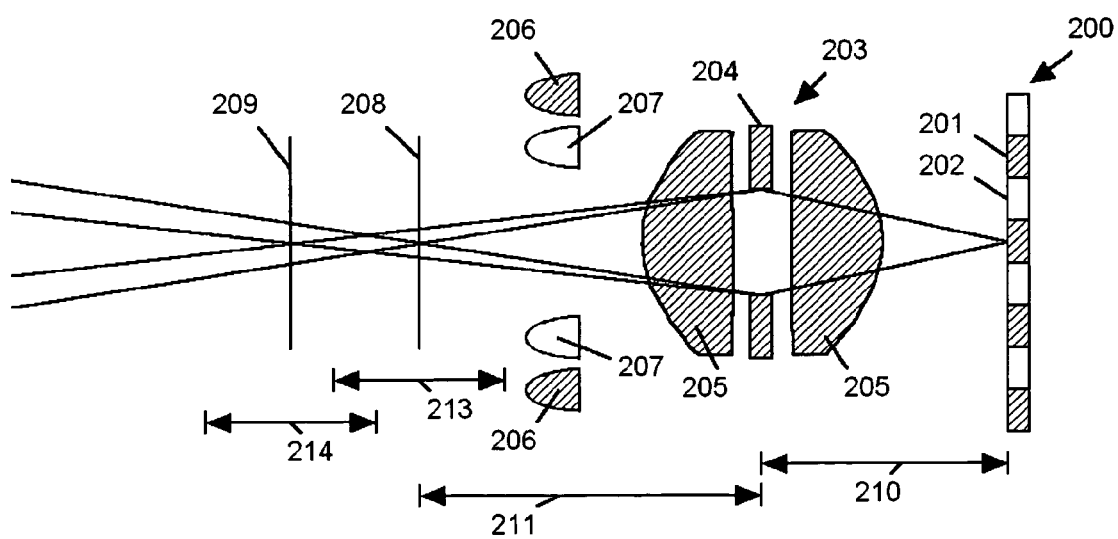
FIG. 2 shows an imaging system according to a first embodiment.
Figure 4:
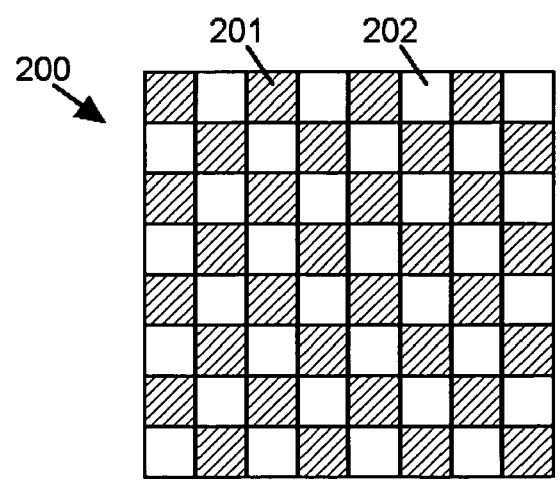
FIG. 4 shows a plan view of the color imager according to the first embodiment.

Referring to FIGS. 2 and 4, a color imager 200, composed of pixels 201 sensitive to one set of wavelengths, and pixels 202 sensitive to another set of wavelengths serves to record an electronic representation of the image impinging on its surface. These pixels 201 and 202 may be considered different colored pixels, as they are sensitive to different wavelengths (aka colors) of light. Imager 200 may consist of more than two colors of pixels, such as red, green, blue, and near-infrared. Lens assembly 203 directs light from a target onto the imager 200. Lens assembly 203 is composed of lenses 205 and aperture 204. Targets are imaged by the system at various distances, such as 208 and 209.

Quasi-monochromatic illumination, such as from LEDs, is directed to the target. Illumination source 206 of a first wavelength is directed to target 209, forming a well focused image on imager 200. Pixels 201 are sensitive to this wavelength and thus record the image of target 209 in electronic form. Illumination source 207 of a second wavelength is directed to target 208, forming a well focused image on imager 200. Pixels 202 are sensitive to this wavelength and thus record the image of target 208 in electronic form. Illumination sources 206 and 207 provide illumination to the target simultaneously. If the target is in position 209, a well focused image will be formed on pixels 201 due to illumination source 206, and a blurry image will be formed on pixels 202 due to illumination source 207. The filtering action of the pixels 201 and 202 prevent them from seeing illumination from the other illumination source. Similarly, if the target is in position 208, a well focused image will be recorded on pixels 202 and a blurry image on the pixels 201. So, an extended depth of field is obtained by processing images from pixels 201 and 202 of imager 200.

Figure 3:
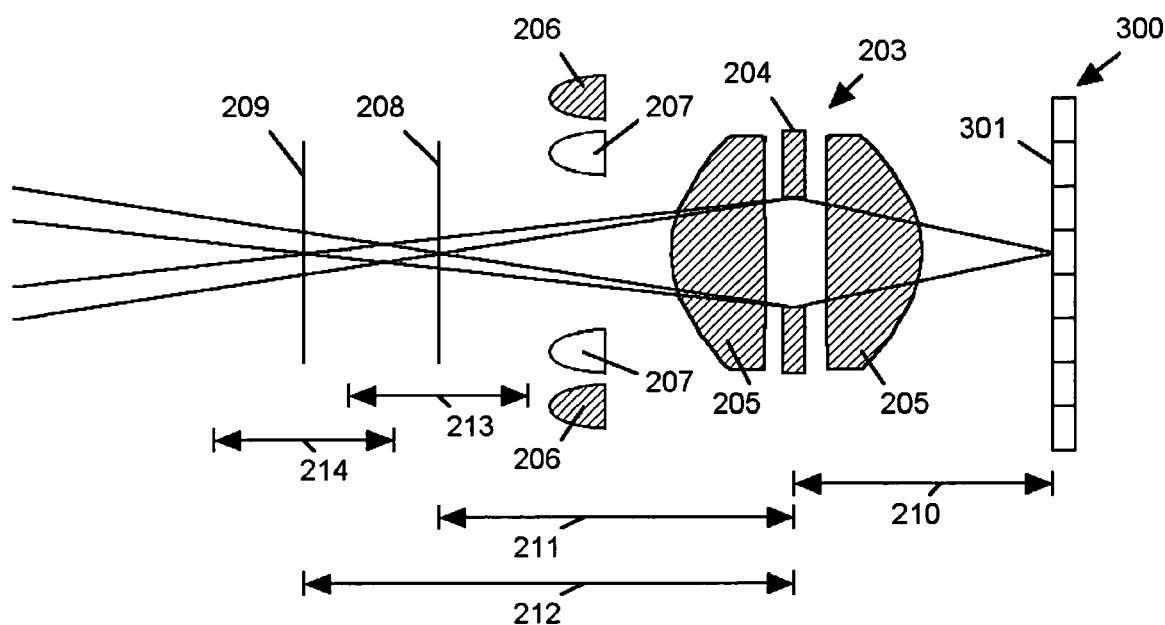
FIG. 3 shows an imaging system according to a second embodiment.

Referring next to FIG. 3, an alternative embodiment incorporates an imager 300, with pixels 301 all sensitive to the same broad range of wavelengths of light. Such an imager 300 is termed a black and white imager. The remainder of the system is identical to the first embodiment, and contains a lens assembly 203, and illumination sources 206 and 207. In the alternative embodiment, however, illumination sources 206 and 207 are enabled in sequential imaging frames. Imager 300 records the image from the target illuminated by source 206 in a first frame and records the image from the target illuminated by source 207 in a second frame. If the target is located at position 208, the image on imager 300 during illumination 207 will be well focused. If the target is located at position 209, the image on imager 300 during illumination 206 will be well focused. So an extended depth of field is obtained by processing images from both illumination sources 206 and 207 in sequential frames.

Figure 5:
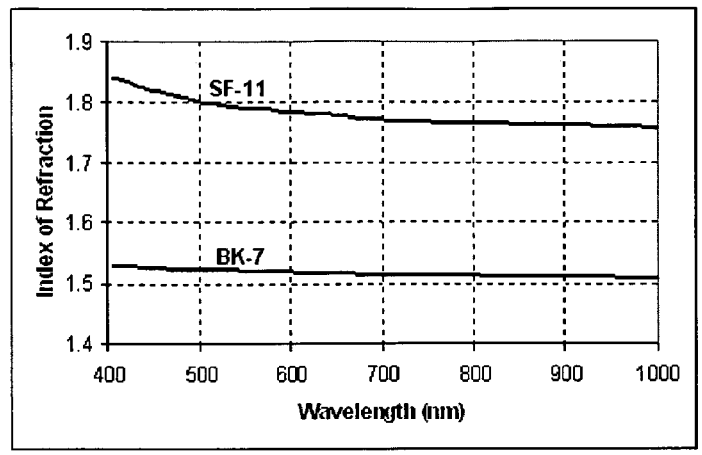
FIG. 5 shows the index of refraction change vs. wavelength in typical optical glasses.

The lens 203 in both the first and second embodiments can be implemented as one or more refractive lenses. Referring to FIG. 5, typical optical glasses have an index of refraction that is a function of wavelength—a property called dispersion. FIG. 5 shows an example of BK-7, a so-called crown glass, and SF-11, a so-called flint glass. The focal length of a lens is a function of the index of refraction, so dispersion causes the focal length to be a function of wavelength and is termed chromatic aberration. Typically, a lens designer tries to minimize chromatic aberration. This is typically done by using multiple lenses of different dispersions. Positive and negative lenses of different dispersions can be combined to minimize the effects of chromatic aberration. In a similar manner, lenses can be combined to accentuate chromatic aberration, as is advantageous for certain embodiments.

Figure 6:
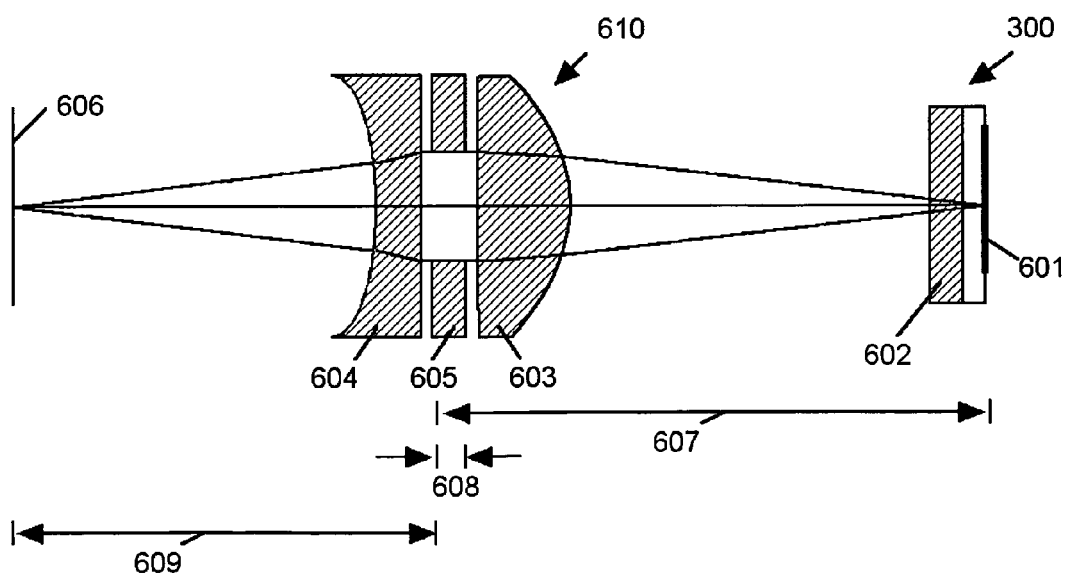
FIG. 6 shows the first lens design with undercorrected chromatic aberration.

Referring to FIG. 6, an example of a refractive lens design using chromatic aberration is shown. Imager 300, composed of imaging surface 601 and cover glass 602 is placed distance 607 behind the front side of circular aperture 605 of a lens assembly 610. A piano-concave lens 604, made of optical material BK7 is placed directly in front of circular aperture 605 of thickness 608. Directly behind circular aperture 605 is piano-convex lens 603, made of optical material SF-11.

Figure 7:
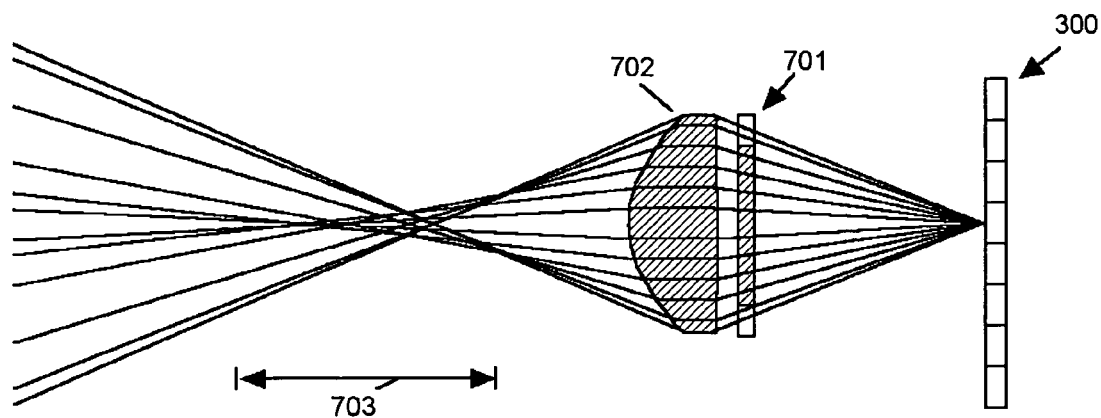
FIG. 7 shows the second lens design with a wavelength sensitive filter.
Figure 9A:
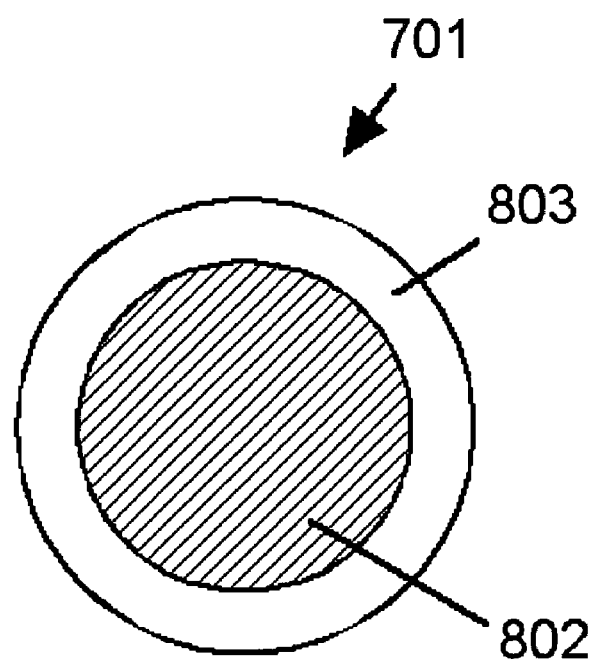
FIG. 9a shows the wavelength sensitive filter according to the second lens design.
Figure 9B:
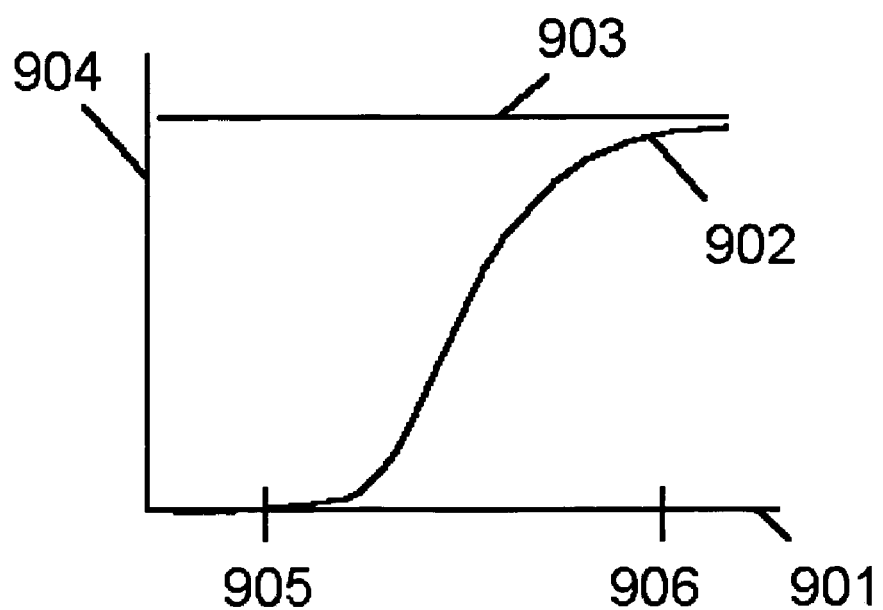
FIG. 9b shows the transmission vs. wavelength behavior of the filter according to the second lens design.

Referring to FIG. 7, a second lens design is shown. This lens design uses either type of imager, although imager 300 (black and white) is shown in the figure. A lens 702 with undercorrected spherical aberration is placed in front of an aperture 701. Aperture 701 forms a wavelength filtering function according to FIGS. 9a and 9b. Referring to FIG. 9a, aperture 701 has a central section 802 and a peripheral section 803. Referring to FIG. 9b, a graph of optical transmission 904 vs. wavelength 901 is shown. Central section 802 of aperture 701 has an optical transmission of 902, which is opaque at wavelength 905 and highly transmissive at wavelength 906. Peripheral portion 803 of aperture 701 has a uniformly high transmission 903. Referring back to FIG. 7, when an illumination of wavelength 906 is reflected from the target, light rays are collected from the full aperture of lens 702, since aperture 701 is highly transmissive throughout its entire area.

Spherical aberration of lens 702 causes light rays from a variety of distances 703 to be focused onto imager 300. At a given target distance, some light will be in focus and others will be focused either in front of or behind the imaging plane, causing a blurry but extended depth of field image, as described in the commonly-owned application referred to above, entitled, "Image reader using a lens having an extended depth of field and a deblurring equalizer."

Figure 8:
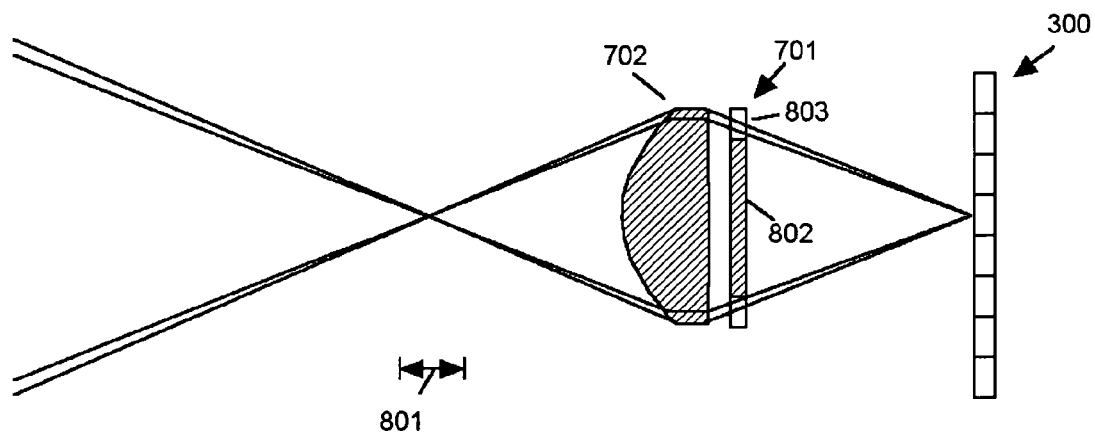
FIG. 8 shows the second lens design focused on a near field distance

Referring now to FIG. 8, if illumination of wavelength 905 is reflected from the target, light rays are only collected from the periphery of lens 702, since aperture 701 has high transmission only at the periphery for this wavelength. In this case, spherical aberration is greatly reduced, and the lens focuses closer, providing well focused images of targets in the range 801. So the aperture 701 and lens 702 provides extended depth of field imaging at wavelength 906 and high resolution imaging at wavelength 905. The lens assembly consisting of aperture 701 and lens 702 effectively has chromatic aberration, as the focal length of the assembly changes with respect to the wavelength, in this case due to the spherical aberration of lens 702 and the filtering action of aperture 701.

Next one specific implementation of a preferred embodiment is described for further illustration. Here, the challenge is achieving a large depth of field for 13 mil bar code label applications, which as noted above is in conflict with achieving 5 mil resolution necessary for reading smaller (higher density) codes. This is a combination of the requirement for a large aperture (to collect a large amount of light to increase the sweep speed) and the resolution limitation of the imager. To achieve 5 mil reading, the focus must be close to the near field limit of the imaging system. To achieve 13 mil long depth of field reading, the focus must be at the mid-point of the depth of field (about 5" from the front of a typical scanner).

One solution to this problem was to use two wavelengths of light: IR (850 nm) and yellow (590 nm) were selected. Leveraging the dispersive properties of various glasses, the lens doublet is designed to provide a significant shift in focus with wavelength. The lens is focused to mid-field with IR illumination and focuses near the front of the scanner with yellow light. This dual wavelength design is further useful in that the far field illumination is IR, which is invisible to the eye, allowing bright illumination to be pulsed at the imager frame rate, while avoiding visible flicker, which may be distracting to the user. The yellow light is used for near field, which doesn't have to be as bright (because the field of view is smaller), which is compatible with the lower efficiency (in terms of imager sensitivity and LED power) of yellow LEDs. The desired depth of field of 8 inches for 13 mil barcodes and a depth of field of 1.5 inches for 5 mil barcodes was achieved, while using a lens system with an approximate clear aperture of f/5.

It will be obvious to those having skill in the art that many changes may be made to the details of the above-described embodiments without departing from the underlying principles of the invention. The scope of the present invention should, therefore, be determined only by the following claims.

The invention claimed is:

1. An imaging system comprising:
   an electronic imaging device;
   a lens assembly having one or more lenses constructed and arranged to accentuate chromatic aberration for providing a wavelength dependent focal shift, the lens assembly being disposed between the imaging device and a target region; and
   an illumination source for illuminating an optical code label on an object located in the target region so that, in use, at least some illumination from the illumination source can be reflected from the optical code label, through the lens assembly and impinge on the imaging device;
   wherein the illumination source emits at least two different quasi-monochromatic wavelengths of light that are reflected from the optical code label,
   wherein at least one of the two different quasi-monochromatic wavelengths of light is infrared light.

2. The imaging system of claim 1 wherein:
   the electronic imaging device includes an array of pixels;
   a first subset of the pixels are sensitive to a first set of wavelengths of light that includes a first one of said quasi-monochromatic wavelengths of light; and
   a second subset of the pixels are sensitive to a second set of wavelengths of light that includes a different one of said quasi-monochromatic wavelengths of light.

3. The imaging system of claim 2 wherein at least one of the emitted quasi-monochromatic wavelengths of light is visible light.

4. An imaging system comprising:
   an electronic imaging device;
   a lens assembly having chromatic aberration, disposed between the imaging device and a target region; and
   an illumination source for illuminating an object located in the target region so that, in use, at least some illumination from the illumination source can be reflected from the object, through the lens assembly and impinge on the imaging device,
   wherein the illumination source emits at least two different quasi-monochromatic wavelengths of light,
   wherein the electronic imaging device includes an array of pixels;
   a first subset of the pixels are sensitive to a first set of wavelengths of light that includes a first one of said quasi-monochromatic wavelengths of light; and
   a second subset of the pixels are sensitive to a second set of wavelengths of light that includes a different one of said quasi-monochromatic wavelengths of light,
   wherein at least one of the emitted quasi-monochromatic wavelengths of light is infrared light.

5. The imaging system of claim 4 wherein at least one of the emitted quasi-monochromatic wavelengths of light is visible light.

6. The imaging system of claim 1 wherein the illumination source comprises a light emitting diode.

7. The imaging system of claim 1 wherein the illumination source comprises at least a plurality of visible light emitting LEDs and a plurality of infrared light emitting LEDs.

8. The imaging system of claim 1 wherein the electronic imaging device comprises an array of pixel elements and further includes wavelength selective filters over at least a subset of the array of pixel elements for distinguishing between the two different quasi-monochromatic wavelengths of light.

9. The imaging system of claim 1 wherein:
   the electronic imaging device comprises an array of pixel elements and is arranged to capture sequential frames of data, each frame comprising data responsive to light incident on substantially the entire array of pixel elements.

10. The imaging system of claim 1 wherein the lens assembly comprises at least one glass lens that is highly dispersive and uncorrected for chromatic aberration.

11. The imaging system of claim 1 wherein the lens assembly comprises:
a first rotationally symmetric lens;
a second rotationally symmetric lens substantially axially aligned with the first lens; and
an aperture element positioned in between the first and second lenses.

12. The imaging system of claim 11 wherein the aperture element includes a central zone positioned adjacent an optical axis of the first and second lenses, and a peripheral zone generally surrounding the central zone; wherein the central zone is substantially transparent to transmission of light while the peripheral zone is substantially opaque.

13. The imaging system of claim 12 wherein the aperture central zone is substantially circular, and the peripheral zone generally surrounds the central region in an annular configuration.

14. The imaging system of claim 11 wherein the said chromatic aberration is substantially caused by refractive dispersion of at least one element of the lens assembly.

15. The imaging system of claim 11 wherein the said chromatic aberration is substantially caused by diffractive dispersion of at least one surface of the lens assembly.

16. The imaging system of claim 1 wherein:
the electronic imaging device comprises an array of pixel elements and is arranged to capture sequential frames of data, each frame comprising data responsive to light incident on substantially the entire array of pixel elements; and
the illumination source controllably emits at least one of the quasi-monochromatic wavelengths of light during the capture of a frame of data.

17. An imaging system comprising:
an electronic imaging device;
a lens assembly having chromatic aberration, disposed between the imaging device and a target region; and
an illumination source for illuminating an object located in the target region so that, in use, at least some illumination from the illumination source can be reflected from the object, through the lens assembly and impinge on the imaging device,
wherein the illumination source emits at least two different quasi-monochromatic wavelengths of light, wherein the lens assembly comprises:
a first rotationally symmetric lens having undercorrected spherical aberration; and
an aperture element substantially axially aligned along the optical axis of the first lens; wherein the aperture element is wavelength dependent.

18. The imaging system of claim 17 wherein the wavelength dependent aperture element includes at least first and second zones having different optical transmission characteristics as a function of wavelength such that a first zone is relatively transmissive to light of a selected quasi-monochromatic wavelength while the second zone is not.

19. The imaging system of claim 1 wherein the lens assembly exhibits at least sufficient chromatic aberration at the two different quasi-monochromatic wavelengths of light so as to extend the depth of a target field within which an image of the illuminated optical code received at the electronic imaging location is substantially in focus.

20. An extended depth of field imaging method comprising:
illuminating an optical code label on a target object with at least two different quasi-monochromatic wavelengths of light, wherein the at least two different quasi-monochromatic wavelengths of light are reflected from the optical code label, and; wherein at least one of the two different quasi-monochromatic wavelengths of light is infrared light;
receiving light of the at least two different quasi-monochromatic wavelengths reflected from the illuminated optical code label at an electronic imaging location; and
interposing a lens assembly having chromatic aberration between the illuminated optical code label and the electronic imaging location so as to extend the depth of a target field within which an image of the illuminated optical code label received at the electronic imaging location is substantially in focus.

21. The method of claim 20 and further comprising:
providing an imager at the electronic imaging location;
operating the imager to capture a series of imaging frames;
illuminating the target with a first one of the quasi-monochromatic wavelengths of light during capture of a first one of the imaging frames; and
illuminating the target with a second one of the quasi-monochromatic wavelengths of light during capture of a second one of the imaging frames.

22. The method of claim 21 wherein the imager is a color imager and both illuminating steps are carried out during capture of a single imaging frame.

23. The method of claim 22 wherein the illuminating steps are carried out substantially simultaneously.

24. The method of claim 20 wherein the imager is a color imager and said illuminating step includes illuminating the target with both of the quasi-monochromatic wavelengths of light substantially simultaneously; and the method further comprises processing data from the imager as separate color planes so as to distinguish between the wavelengths of illumination.

25. An extended depth of field imaging method comprising:
illuminating a target with at least two different quasi-monochromatic wavelengths of light;
receiving light reflected from the illuminated target at an electronic imaging device;
interposing a lens assembly having chromatic aberration between the illuminated target and the electronic imaging location so as to extend the depth of a target field within which an image of the illuminated target received at the electronic imaging location is substantially in focus;
providing the electronic imaging device with an array of pixels, wherein a first subset of the pixels are sensitive to a first set of wavelengths of light that includes a first one of said quasi-monochromatic wavelengths of light, and a second subset of the pixels are sensitive to a second set of wavelengths of light that includes a different one of said quasi-monochromatic wavelengths of light wherein at least one of the two different quasi-monochromatic wavelengths of light is infrared light.

* * * * *

UNITED STATES PATENT AND TRADEMARK OFFICE
CERTIFICATE OF CORRECTION

PATENT NO. : 7,224,540 B2 Page 1 of 1
APPLICATION NO. : 11/048624
DATED : May 29, 2007
INVENTOR(S) : Olmstead et al.

It is certified that error appears in the above-identified patent and that said Letters Patent is hereby corrected as shown below:

<u>Column 6</u>
Line 46, change "piano" to --plano--.
Line 49, change "piano" to --plano--.

<u>Column 8</u>
Line 33, change "wayelengths" to --wavelengths--.

<u>Column 10</u>
Line 7, delete "and"

Signed and Sealed this

Twenty-fourth Day of March, 2009

JOHN DOLL
*Acting Director of the United States Patent and Trademark Office*